US012234362B2

(12) United States Patent
Pitchumani et al.

(10) Patent No.: US 12,234,362 B2
(45) Date of Patent: Feb. 25, 2025

(54) REFLECTIVE PARTICULATE COMPOSITIONS INCLUDING A PARTICULATE MIXTURE HAVING IMPROVED HARDNESS, METHODS OF MAKING THE SAME, AND METHODS FOR ANALYZING PARTICULATE MIXTURE STRENGTH

(71) Applicant: U.S. SILICA COMPANY, Katy, TX (US)

(72) Inventors: Ramanan Pitchumani, Hagerstown, MD (US); William Wells, Hancock, MD (US); David Earl Weller, Jr., Greencastle, MD (US)

(73) Assignee: U.S. Silica Company, Katy, TX (US)

( * ) Notice: Subject to any disclaimer, the term of this patent is extended or adjusted under 35 U.S.C. 154(b) by 527 days.

(21) Appl. No.: 17/112,510

(22) Filed: Dec. 4, 2020

(65) Prior Publication Data

US 2022/0177707 A1 Jun. 9, 2022

(51) Int. Cl.
| | |
|---|---|
| *C09C 1/42* | (2006.01) |
| *C09C 1/00* | (2006.01) |
| *E04D 7/00* | (2006.01) |
| *G01N 3/10* | (2006.01) |

(52) U.S. Cl.
CPC .............. *C09C 1/42* (2013.01); *C09C 1/0081* (2013.01); *E04D 7/005* (2013.01); *G01N 3/10* (2013.01); *C01P 2006/90* (2013.01); *G01N 2203/0019* (2013.01); *G01N 2203/0042* (2013.01); *G01N 2203/0087* (2013.01)

(58) Field of Classification Search
None
See application file for complete search history.

(56) References Cited

U.S. PATENT DOCUMENTS

| | | | |
|---|---|---|---|
| 10,253,493 B2 | 4/2019 | Jenree et al. | |
| 2007/0023187 A1 | 2/2007 | Canova et al. | |
| 2011/0081537 A1 | 4/2011 | Sexauer et al. | |
| 2016/0326746 A1 | 11/2016 | Shiao et al. | |
| 2017/0158865 A1* | 6/2017 | Kratochvil | C09D 133/00 |
| 2018/0058065 A1* | 3/2018 | Jenree | C08K 3/36 |

* cited by examiner

*Primary Examiner* — Ronak C Patel
(74) *Attorney, Agent, or Firm* — The Webb Law Firm

(57) ABSTRACT

A reflective granular composition including a reflective pigment material including a majority of kaolin clay and a hardening additive including a sodium salt or another salt. A method for making a reflective granular composition includes the steps of mixing together a reflective pigment material including a majority of kaolin clay and a hardening additive including a sodium salt or another salt to form a particulate mixture, forming a slurry from the particulate mixture by adding to the particulate mixture water and a binder material, granulating the slurry, drying the granulated slurry, and kilning the dried, granulated slurry to form the reflective granular composition. Methods of analyzing the strength of a reflective granular composition are also disclosed.

16 Claims, 13 Drawing Sheets

REFLECTIVE PARTICULATE COMPOSITIONS INCLUDING A PARTICULATE MIXTURE HAVING IMPROVED HARDNESS, METHODS OF MAKING THE SAME, AND METHODS FOR ANALYZING PARTICULATE MIXTURE STRENGTH

TECHNICAL FIELD

The present disclosure generally relates to reflective particulate compositions that include a particulate mixture having improved hardness, which may find application for example in roofing materials, and methods of making the same. Additionally, the present disclosure relates to methods for analyzing the strength of such a particulate mixture.

BACKGROUND

Commercial and residential roofs are continuously exposed to the outside elements, which are often harsh or extreme. Even under moderate external conditions, these roofs are exposed to environmental or weather conditions that affect the ability of the roofs to insulate the building or residence interiors from the effects of the environmental or weather conditions. In many parts of the world, during the summer months, roofs are continuously exposed to high heat and sunny conditions under which the roofing materials absorb solar energy and retain high levels of heat. As the roofs absorb the solar energy and retain heat, the conditions inside the underlying buildings or residences suffer adversely, which often causes the interiors to heat up to uncomfortable conditions.

In order to remedy these conditions, the buildings or residences often resort to increased amounts of internal insulation, or increased use of artificial cooling systems (e.g., HVAC equipment). However, increasing the amount of insulation has a limited ability to reduce heat transfer, and increasing energy costs make the increased use of artificial cooling systems undesirable or even cost-prohibitive.

One proposed solution to the foregoing problem is to employ a roofing material that is highly reflective, thereby preventing the roofing materials from absorbing much of the solar energy to which they are exposed. Many such reflective roofing materials include granules that are formed by mixing a reflective pigment, such a kaolin clay (which is a silicate mineral clay), along with a binder, and thereafter extruding and kilning the mixture to form the granules. The strength of these granules is important because breakage can occur during transportation and handling. Moreover, after application of these granules to asphalt on roofs of buildings, these granules can break under the body weight of personnel walking on the roof. Broken or otherwise damaged granules are less effective at reflecting solar radiation. As such, improving the strength of the granules is an important factor in maintain adequate performance.

Accordingly, it would be desirable to provide improved reflective granular compositions, and methods of making the same, that are highly reflective to solar radiation. Moreover, it would be desirable to provide such reflective granular compositions that include granules with improved strength that are resistant to breaking during storage, transportation, and application. Still further, it would be desirable to provide methods for analyzing the strength of such reflective granular compositions to ensure the quality of the source materials employed and to optimize their composition. Furthermore, other desirable features and characteristics of the particular compositions and associated analyzing methods will become apparent from the subsequent detailed description and the appended claims, taken in conjunction with the accompanying drawings and the preceding background.

BRIEF SUMMARY

Disclosed herein are exemplary embodiments of reflective granular compositions, methods for making reflective granular compositions, and methods of analyzing the strength of reflective granular compositions. As such, in accordance with one exemplary embodiment, a reflective granular composition includes a reflective pigment material including a majority of kaolin clay and a hardening additive including a sodium salt or another salt.

In accordance with another embodiment, a method for making a reflective granular composition includes the steps of mixing together a reflective pigment material including a majority of kaolin clay and a hardening additive including a sodium salt or another salt to form a particulate mixture, forming a slurry from the particulate mixture by adding to the particulate mixture water and a binder material, granulating the slurry, drying the granulated slurry, and kilning the dried, granulated slurry to form the reflective granular composition.

In accordance with yet another embodiment, a method of analyzing the strength of a reflective granular composition includes the steps of providing a piston/cell apparatus, wherein the piston/cell apparatus includes a crush cell and a piston that is sized in conformity with a diameter of an opening of the crush cell, disposing an amount of the reflective granular composition within the crush cell, inserting the piston within the crush cell, supplying a compression force to the piston such that the reflective granular composition within the crush cell is crushed, and sieving the crushed reflective granular composition.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWING

The present disclosure will hereinafter be described in conjunction with the following drawing figures, wherein like numerals denote like elements, and wherein.

DETAILED DESCRIPTION

Figure 1:
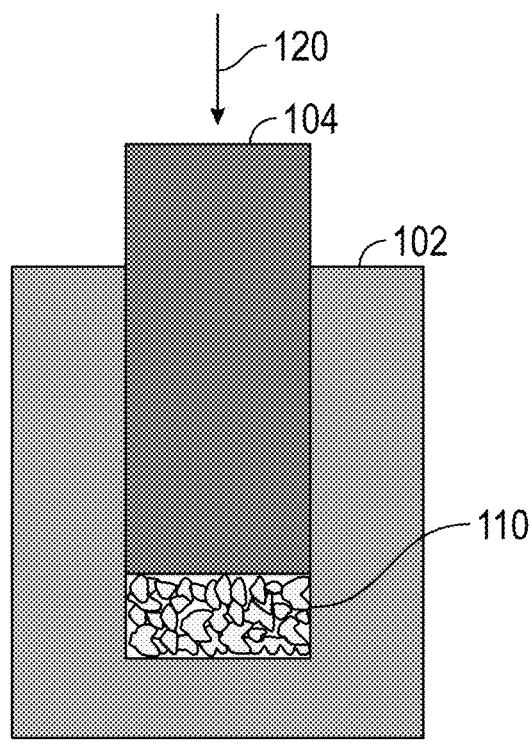
FIG. 1 is a cross-sectional view of a piston/cell apparatus suitable for use in performing a granule strength analyzing method in accordance with the present disclosure.

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. Furthermore, as used herein, numerical ordinals such as "first," "second," "third," etc., such as first, second, and third components, simply denote different singles of a plurality unless specifically defined by language in the appended claims. All of the embodiments and implementations described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

As used herein, the term "particulate roofing material," and like terms, refer to solar reflective particulates or granules that are useful in so-called "cool roof" applications, and indeed, the term "particulate roofing material" is used interchangeably with the terms "solar reflective particulates," "solar reflective granules," "reflective particulates," "reflective granules," and like terms. Additionally, while the particulates and granules described herein are touted for their efficacy in "cool roof" applications, it is understood that the described particulates and granules may have other uses and applications, and that the described embodiments are not limited to use in "cool roof" applications. For example, in some embodiments, the particulate roofing materials described herein may be useful on any exterior surface, for example, as a filler in an exterior paint, or like application.

Disclosed herein are embodiments of reflective particulate compositions that include a particulate mixture having improved hardness, which may find application for example in roofing materials, and methods of making the same. Additionally, the present disclosure relates to methods for analyzing the strength of such a particulate mixture. The particulate mixture includes granules that are a mixture of a reflective pigment, which includes primarily a kaolin clay, and a sodium salt, which in examples may be sodium silicate or sodium hydroxide, for improving the hardness of the granules. The method for forming the granules includes mixing the reflective pigment and the hardening sodium salt, forming a slurry therefrom by adding water and a binder, such as polyvinyl alcohol, extruding the slurry, drying the slurry, granulizing the slurry, for example by crushing, and then kilning the granules. The granules have a hardness that may be measured using the methods of the present disclosure, which includes the steps of providing a piston/cell apparatus, wherein the piston/cell apparatus includes a crush cell and a piston that is sized in conformity with a diameter of an opening of the crush cell, disposing an amount of the reflective granular composition within the crush cell, inserting the piston within the crush cell, supplying a compression force to the piston such that the reflective granular composition within the crush cell is crushed, and sieving the crushed reflective granular composition.

Reflective Pigment (Kaolin Clay)

The particulate mixture of the reflective particulate compositions of the present disclosure include a reflective pigment, which includes kaolin clay, but may also include some amount of other reflective pigments. As used herein, the term "clay-based pigment compositions" refers to pigment compositions that include clay (e.g., hydrous or calcined kaolin clay) as the primary component (i.e., clay is present in the pigment composition in the largest quantity over any other component). Also, in some embodiments, the clay-based pigment composition includes a majority of clay, i.e., clay is present in the clay-based pigment composition in an amount of 50% by weight or greater. In many embodiments, the clay-based pigment composition is entirely (i.e., essentially 100%) clay. While in other possible embodiments, for example, the clay is present in the clay-based pigment composition in an amount of 60% by weight or greater, or 60% by weight to 90% by weight.

The type or source of the kaolin clay used as the majority or entire ingredient in the clay-based pigment composition is not particularly limited in the present disclosure. Non-limiting examples of kaolin clay materials include EPK kaolin (e.g., having an Fe content of about 0.93 wt %, where the reported Fe content is adjusted to exclude loss-on-ignition (LOI) and normalized to a total oxide content of 100%) available from Edgar Minerals (Edgar, Fla.), MCNAMEE® kaolin (e.g., having an Fe content of about 0.38 wt %, where the reported Fe content is adjusted to exclude LOI and normalized to a total oxide content of 100%) available from Vanderbilt Minerals, LLC (Norwalk, Conn.), Kingsley kaolin (e.g., having an Fe content of 0.45 wt %, where the reported Fe content is adjusted to exclude LOI and normalized to a total oxide content of 100%) available from Kentucky-Tennessee Clay Company (Roswell, Ga.), 6 TILE® kaolin (e.g., having an Fe content of about 0.4 wt %, where the reported Fe content is adjusted to exclude LOI and normalized to a total oxide content of 100%) available from Kentucky-Tennessee Clay Company (Roswell, Ga.), optiKasT kaolin (e.g., having an Fe content of about 0.58 wt %, where the reported Fe content is adjusted to exclude LOI and normalized to a total oxide content of 100%) available from Kentucky-Tennessee Clay Company (Roswell, Ga.), and lone Airfloated Kaolin (e.g., having an Fe content of about 0.7 wt %, where the reported Fe content is adjusted to exclude LOI and normalized to a total oxide content of 100%) available from lone Minerals, Inc. (Ione, Calif.).

While the clay-based pigment composition includes clay (e.g., hydrous or calcined kaolin) as the primary component, in some embodiments, the clay-based pigment composition may include secondary pigment components. For example, the secondary pigment components may include additional pigment materials, and/or pigment additives. Some non-limiting examples of suitable secondary pigment components include metal and transition metal oxides (e.g., $TiO_2$, ZnO, SnO and various titanates), alkaline earth metal sulfates (e.g., $BaSO_4$, $MgSO_4$ (including anhydrous or hydrated forms, such as, e.g., Epsom salt) and the like), alkaline earth metal carbonates (e.g., $SrCO_3$ and $BaCO_3$), transition metal silicates (e.g., $ZrSiO_4$), metal silicates (e.g., alkaline earth metal silicates and alkali metal silicates, nonlimiting examples of which include $Ca_2SiO_4$, $Ba_2SiO_4$, magnesium silicate, and $ZrSiO_4$) and minerals (e.g., cristobalite). For example, in some embodiments, the secondary pigment component may include $TiO_2$, $BaSO_4$, ZnO, $ZrSiO_4$, $SrCO_3$, a metal silicate (e.g., an alkali metal silicate and/or an alkaline earth metal silicate), and/or cristobalite.

Hardening Additives

To improve the strength of the resulting granules, the clay-based pigment composition may be mixed with one or more hardening additives. The hardening additives suitable for use in accordance with the present disclosure include sodium salts. Exemplary sodium salts that may form the hardening additives may include, in one embodiment, sodium silicate, sodium hydroxide, or a mixture thereof. In further exemplary embodiments, the sodium salts that may form the hardening additives may include sodium carbonate, sodium chloride, sodium polyacrylate, sodium sulfate, sodium thiosulfate, sodium phosphate, or a mixture thereof. Any of the foregoing salts of barium, potassium, calcium, and lithium may alternatively be employed, in embodiments. Hydrated forms of any of the foregoing salts are additionally suitable. Sodium (and other) salts of the foregoing varieties are typically commercially supplied in either a powder or granular/crystalline form, which may then suitably be mixed with the clay-based pigment composition.

In some embodiments, the hardening additives may be mixed with the clay-based pigment composition in an amount, based on the total weight of the clay-based pigment composition, of about 1 wt % to about 15 wt %. In other embodiments, the hardening additives may be mixed with the clay-based pigment composition in an amount, based on the total weight of the clay-based pigment composition, of about 1 wt % to about 12 wt %, about 1 wt % to about 10 wt %, about 1 wt % to about 8 wt %, or about 1 wt % to about 5 wt %. In further embodiments, the hardening additives may be mixed with the clay-based pigment composition in an amount, based on the total weight of the clay-based pigment composition, of about 3 wt % to about 15 wt %, about 5 wt % to about 15 wt %, about 8 wt % to about 15 wt %, or about 10 wt % to about 15 wt %. In particular embodiments, the hardening additives may be mixed with the clay-based pigment composition in an amount, based on the total weight of the clay-based pigment composition, of about 1 wt % to about 3 wt %, about 3 wt % to about 5 wt %, about 5 wt % to about 7 wt %, about 7 wt % to about 10 wt %, about 10 wt % to about 12 wt %, or about 12 wt % to about 15 wt %.

Slurry Formation

The clay-based pigment composition and one or more hardening additive mixture is prepared in the form of a slurry for further processing. The slurry may include a liquid media (e.g., water) in addition to one or more binder compositions. The slurry may for a substantially homogeneous mixture. As used herein, the term "substantially" is used as a term of approximation, and not as term of degree, and is intended to account for the inherent deviations and variations in measured, observed or calculated properties or values. Accordingly, the term "substantially homogeneous" denotes that the while the mixture may not be perfectly homogeneous, the mixture would be considered homogeneous by those of ordinary skill in the art.

In exemplary embodiments, a method of forming the slurry includes adding a liquid media (e.g., water) to the mixture of components until a desired consistency is achieved. The desired consistency at this stage of the process may vary depending on a variety of factors, e.g., whether the composition is desired to be ultimately moldable or flowable. In some embodiments, however, the liquid media may be added to mixture in an amount of about 20 wt % to about 50 wt %, or about 30 wt % to about 40 wt %. For example, in some embodiments in which the composition is desired to be moldable, the liquid media may be added to the mixture in an amount of about 20 wt % to about 40 wt %, for example, about 25 wt % to about 35 wt %, or about 30 wt %. In some embodiments in which the composition is desired to be flowable, the liquid media may be added to the mixture in an amount of about 30 wt % to about 50 wt %, for example about 35 wt % to about 45 wt %, or about 40 wt %.

Moreover, in order to improve the consistency and adhesion of the particles within the slurry, a binder material may be added. Suitable binder materials include the class of water-soluble polymers, particularly water-soluble synthetic polymers. Water-soluble synthetic polymers contain hydrophilic functional groups, such as ethers, alcohols, amides, and pyrrolidones. A particularly suitable binder material in accordance with the present disclosure is polyvinyl alcohol. The binder material may be added to the slurry mixture in an amount of about 1 wt % to about 10 wt %, such as about 3 wt % to about 8 wt %. In other embodiments, the binder material may be added to the slurry mixture in an amount of about 1 wt % to about 8 wt %, about 1 wt % to about 5 wt %, about 3 wt % to about 10 wt %, or about 5 wt % to about 10 wt %. In particular embodiments, the binder material may be added to the slurry mixture in an amount of about 1 wt % to about 3 wt %, about 3 wt % to about 5 wt %, about 5 wt % to about 8 wt %, or about 8 wt % to about 10 wt %.

Granule Formation

The slurry may then be processed into granule form. In an exemplary embodiment, a method may further include extruding the slurry, or Niro spray granulating the slurry, and then drying the extruded or Niro sprayed product. The drying may be performed at any suitable temperature to substantially drive off the liquid media. As discussed above, as used herein, the term "substantially" is a term of approximation, and not a term of degree, and the phrase "substantially drive off the liquid media" is intended to account for inherent deviations in the measurement, calculation or observation of the amount of the liquid media remaining in the mixture after drying. For example, the liquid media would be considered substantially driven off if the amount of liquid media remaining in the mixture is either not detectable or is otherwise negligible, as would be understood by those of ordinary skill in the art.

The temperature for drying the slurry is not particularly limited, and it may vary depending on the liquid media selected. However, the temperature should be high enough to substantially drive off the liquid media, but not high enough to constitute a heat treatment or kilning procedure. For example, drying may be performed at a temperature of about 100° C. to about 800° C., for example about 100° C. to about 700° C., about 120° C. to about 160° C., or about 130° C. to about 150° C. Additionally, the time needed to dry the wet mixture is not particularly limited, and it may vary depending on the consistency of the wet mixture, the liquid media used in the wet mixture, the temperature used to perform the drying, and the amount of the liquid media in the wet mixture. In some embodiments, drying is performed for about 10 minutes to about 90 minutes, for example about 20 minutes to about 70 minutes, or about 30 minutes to about 60 minutes.

The dried mixture may then be crushed and/or kilned (or subjected to heat treatment). In embodiments in which the dried mixture is both crushed and kilned, the dried mixture may either be crushed first and then kilned, or kilned first, and then crushed. Indeed, in some embodiments, the dried mixture may first be crushed (i.e., prior to kilning) to the desired particle size, using a crusher and sieves of the desired size. This pre-crushing allows any fine materials (or fine particulates) to be re-introduced into the product feed, thereby reducing the amount of waste material generated by the process. The fine particles generated during the crushing process may be recycled by reintroducing them into the production feed. However, because of their smaller particle size, the amount of the liquid media needed to reach the desired consistency of the wet mixture may be increased. In some embodiments, the recycled fine particles may be added to the production feed in amount of about 25 wt % of the feed or less.

As discussed above, according to embodiments of the present disclosure, the dried mixture may be kilned either before or after crushing. The kilning process may be performed at any suitable temperature and for any suitable length of time. For example, in some embodiments, the dried mixture (either before or after crushing) may be kilned (or fired) at a temperature of about 1000° C. to about 1300° C., such as about 1025° C. to about 1275° C., for example about 1050° C. to about 1250° C. Additionally, in some embodiments, the dried mixture may be kilned (or fired) for about 30 minutes to about 90 minutes, for example about 45 minutes to about 75 minutes, about 50 minutes to about 70 minutes, or about 60 minutes.

The resulting granules, in some embodiments, may have a bulk density of 40 lbs/ft$^3$ to 75 lbs/ft$^3$, for example 50 lbs/ft$^3$ to 75 lbs/ft$^3$, 40 lbs/ft$^3$ to 60 lbs/ft$^3$, 50 lbs/ft$^3$ to 60 lbs/ft$^3$, or 45 lbs/ft$^3$ to 60 lbs/ft$^3$. In some embodiments, the particulate composition may have a bulk density of 50 lbs/ft$^3$ to 60 lbs/ft$^3$, for example 52 lbs/ft$^3$ to 58 lbs/ft$^3$, or 53 lbs/ft$^3$ to 56 lbs/ft$^3$. The relatively low bulk density of the particulate composition enables significant cost savings. For example, the lower bulk density allows the application of fewer of the particulates (or granules) per unit area (or square) while still achieving the solar reflectance benefits (such as, for example, high total solar reflectance, and/or UV, VIS and/or IR reflectance).

Furthermore, the resulting granules, in some embodiments, may have a bulk total solar reflectance (also referred to herein as "total solar reflectance" (TSR) or simply "solar reflectance") of 70% or greater as measured using a reflectometer from Surface Optics Corporation (San Diego, Calif.). For example, the 410-Solar visible/NIR Portable Reflectometer from Surface Optics Corporation (San Diego, Calif.) may be used, which measures reflectance over 7 wavelength bands and uses an algorithm to calculate the total solar reflectance. In some embodiments, the particulate composition has a solar reflectance of at least 60%, for example, at least 70% or at least 80%. In some embodiments, the particulate composition may have a solar reflectance of at least 80%, and in some embodiments may have a total solar reflectance of at least 85%, or at least 90%. For example, in some embodiments, the particulate composition may have a total solar reflectance of 90% or greater. For example, in some embodiments, the particulate composition has a solar reflectance of 60% to 95%, 70% to 95%, 80% to 95%, 70% to 90%, 80% to 90%, 85% to 95%, or 90% to 95%.

Additionally, the particulate composition may have an ultraviolet light ("UV") reflectance (i.e., in the 335-380 nm wavelength band) of at least 20%, for example 20% to 80%. In some embodiments, the particulate composition may have a UV reflectance of at least 25%, for example 25% to 75%, 25% to 70%, or 40% to 70%, as measured using a solar reflectometer from Surface Optics Corporation (San Diego, Calif.). For example, in some embodiments, the particulate composition may have a UV reflectance of 50% or greater, for example, 50% to 70%, as measured using a solar reflectometer from Surface Optics Corporation (San Diego, Calif.).

In addition, the particulate composition may have a visible light ("VIS") reflectance (i.e., in the 400-720 nm wavelength band) of at least 60%, for example 60% to 97%, or 60% to 95%, as measured using a solar reflectometer from Surface Optics Corporation (San Diego, Calif.). For example, in some embodiments, the particulate ro composition may have a VIS reflectance of 70% or greater, for example, 70% to 98%, or 70% to 97%, as measured using a solar reflectometer from Surface Optics Corporation (San Diego, Calif.).

Also, the particulate composition may have an infrared light ("IR") reflectance (i.e., in the 700-2500 nm wavelength band) of at least 60%, for example 60% to 98%, or 60% to 97%, as measured using a solar reflectometer from Surface Optics Corporation (San Diego, Calif.). For example, in some embodiments, the particulate composition may have an IR reflectance of 70% or greater, for example, 70% to 98% or 70% to 97%, as measured using a solar reflectometer from Surface Optics Corporation (San Diego, Calif.).

Analyzing Granule Strength

As initially noted, due to the inclusion of the sodium salt to the clay-based pigment compositions, the reflective granular/particulate compositions of the present disclosure exhibit improved strength. However, the prior art is deficient of robust strength measuring methods to determine the improvement in strength over prior art granular products. For example, currently, the ASTM test often used by the roofing industry for analyzing the strength of aggregates is ASTM D1865/D1865M—09 (2017) ("Standard Test Method for Hardness of Mineral Aggregate Used on Built-Up Roofs"), which is known to sometimes provide an inconsistent or incomplete evaluation of the hardness of granular reflective compositions. Accordingly, the present disclosure provides a method for analyzing the strength of the reflective granular/particulate compositions such the there is a suitable means to determine strength improvement, which will allows for optimizing source pigments, amounts and types of strengthening additives, kilning times and temperatures, and other process variable for producing the reflective granular/particulate compositions.

With reference to FIG. 1, the granule strength analyzing method in accordance with the present disclosure is performed in a piston/cell apparatus 100, as illustrated. The piston/cell apparatus includes a crush cell 102, and a piston 104 that is appropriately sized in conformity with the diameter of the opening of the crush cell 102 (as shown). Using the apparatus 100, the strength analyzing method is performed in the following manner. First a sample of a reflective granular/particulate composition is sieved to approximately −8/+40 mesh. Thereafter, a suitable amount of the sample (110) is added to the crush cell 102. The amount added will depend on the volume of the crush cell 102, but typically the amount should be enough to fill about 10% to about 30% of the volume, such as about 15% to about 25% of the volume. The reflective granular/particulate composition should be approximately level (e.g., visually) within the crush cell 102, which may be performed by shaking or otherwise vibrating the crush cell 102. Thereafter, the piston 104 is inserted within the crush cell 102. When the piston 104 contacts the sample 110, the piston 104 may be rotated for final leveling of the sample 110, for example about ¼ turn to about ¾ turn, such as about ½ turn. The crush cell 102 may the be placed in a compression press (not separately illustrated) for imparting a compression force (120) to the sample 110. The compression force (120) may generally range from about 800 psi/min to about 1200 psi/min, or about 900 psi/min to about 1100 psi/min, such as about 1200 psi/min. The compression force (120) may be held for a suitable period of time, such as about 5 seconds to about 15 seconds, or about 8 seconds to about 12 seconds, for example about 10 seconds. Thereafter, the compression force (120) is released. The crushed sample 110 is then removed from the crush cell 102, and the crushed sample 110 is sieved with 8 mesh, 40 mesh and Pan. After sieving, the strength analyzing method in accordance with the present disclosure includes a step of separately weighing each of the contents of the 8 mesh, the 40 mesh, and the Pan. The result may be reported as percentage of the material in the Pan as compared the fines (8 and 40 mesh).

To illustrate the reproducibility of the resulting strength data when utilizing the foregoing method, five different reflective granular compositions were obtained for testing. The strength of multiple samples of each composition were tested using the foregoing method. The results are presented as Table 1, below:

TABLE 1

| Material | Size | % Fines |
| --- | --- | --- |
| US Silica Produced CRG | −8 + 40 | 4.48 |
| US Silica Produced CRG | −8 + 40 | 4.40 |
| US Silica Produced CRG | −8 + 40 | 4.46 |
| US Silica Produced CRG | −8 + 40 | 5.00 |
| US Silica Produced CRG | −8 + 40 | 4.39 |
| US Silica Toll Produced CRG | −8 + 40 | 10.91 |
| US Silica Toll Produced CRG | −8 + 40 | 10.66 |
| US Silica Toll Produced CRG | −8 + 40 | 12.07 |
| US Silica Toll Produced CRG | −8 + 40 | 11.14 |
| US Silica Toll Produced CRG | −8 + 40 | 10.68 |
| Competitor Product-1 | −8 + 40 | 2.36 |
| Competitor Product-1 | −8 + 40 | 2.36 |
| Competitor Product-1 | −8 + 40 | 2.09 |
| Competitor Product-1 | −8 + 40 | 2.04 |
| Competitor Product-1 | −8 + 40 | 2.05 |
| Competitor Product-2 | −8 + 40 | 1.29 |
| Competitor Product-2 | −8 + 40 | 1.34 |
| Competitor Product-2 | −8 + 40 | 1.74 |
| Competitor Product-2 | −8 + 40 | 1.50 |
| Competitor Product-2 | −8 + 40 | 1.61 |
| Competitor Product-3 | −8 + 40 | 7.73 |
| Competitor Product-3 | −8 + 40 | 7.52 |
| Competitor Product-3 | −8 + 40 | 6.71 |
| Competitor Product-3 | −8 + 40 | 7.06 |
| Competitor Product-3 | −8 + 40 | 7.91 |

Figure 2:
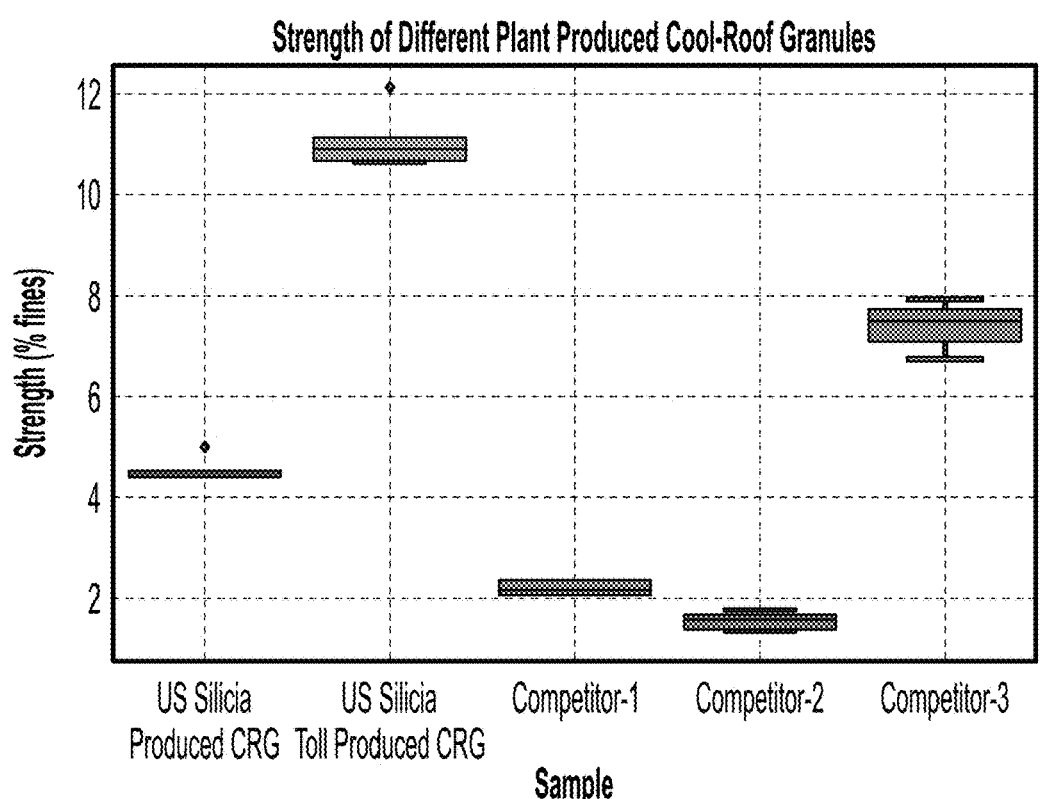
FIG. 2 is a chart illustrating the reproducibility of strength data utilizing an exemplary method of analyzing the strength of a reflective granular composition in accordance with the present disclosure.

FIG. 2 is a chart illustrating the reproducibility of strength data utilizing an exemplary method of analyzing the strength of a reflective granular composition in accordance with the present disclosure, namely, the data listed above in Table 1. As can be seen, the data produced from the tests of each sample agree closely with one another.

ILLUSTRATIVE EXAMPLES

The present disclosure is now illustrated by the following non-limiting examples. It should be noted that various changes and modifications may be applied to the following examples and processes without departing from the scope of this invention, which is defined in the appended claims. Therefore, it should be noted that the following examples should be interpreted as illustrative only and not limiting in any sense.

Various examples of reflective granular compositions were prepared in accordance with the teachings of the present disclosure. For each example, the reflective pigment employed was essentially 100% kaolin clay, although the type of such clay employed varied from example to example, as will be noted below in the description of each example. Moreover, for each example, either sodium silicate or sodium hydroxide was used as the hardening additive, in various percentage amounts, as will be noted below in the description of each example. Still further, for each example, the kilning process was performed for approximately 60 minutes, although at various temperatures, either 1050° C., 1150° C., or 1250° C., as will be noted below in the description of each example.

Example 1

Figure 3A:
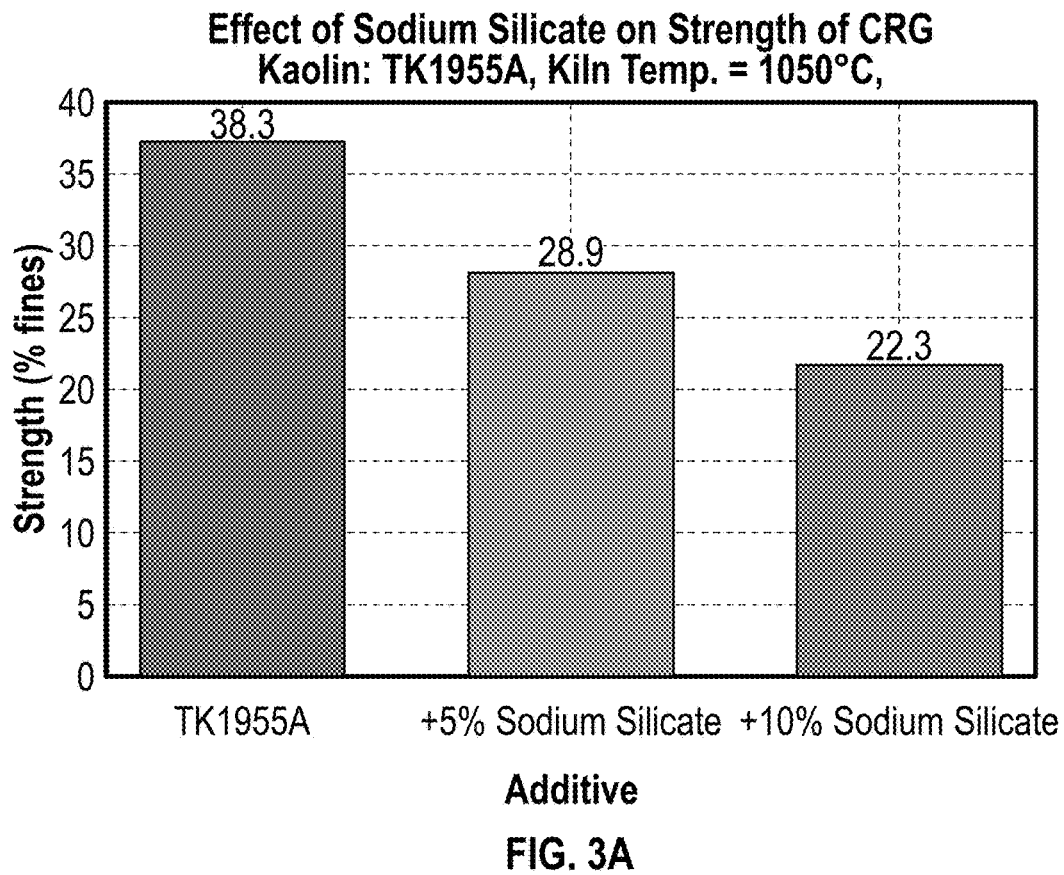
FIGS. 3A, 5A, 7A, 9A, 10A, 11A, 12A, 13A, and 14A illustrate the strength values of various reflective granular compositions using sodium silicate as the hardening additive, with various different kaolin compositions and kiln temperatures.
Figure 3B:
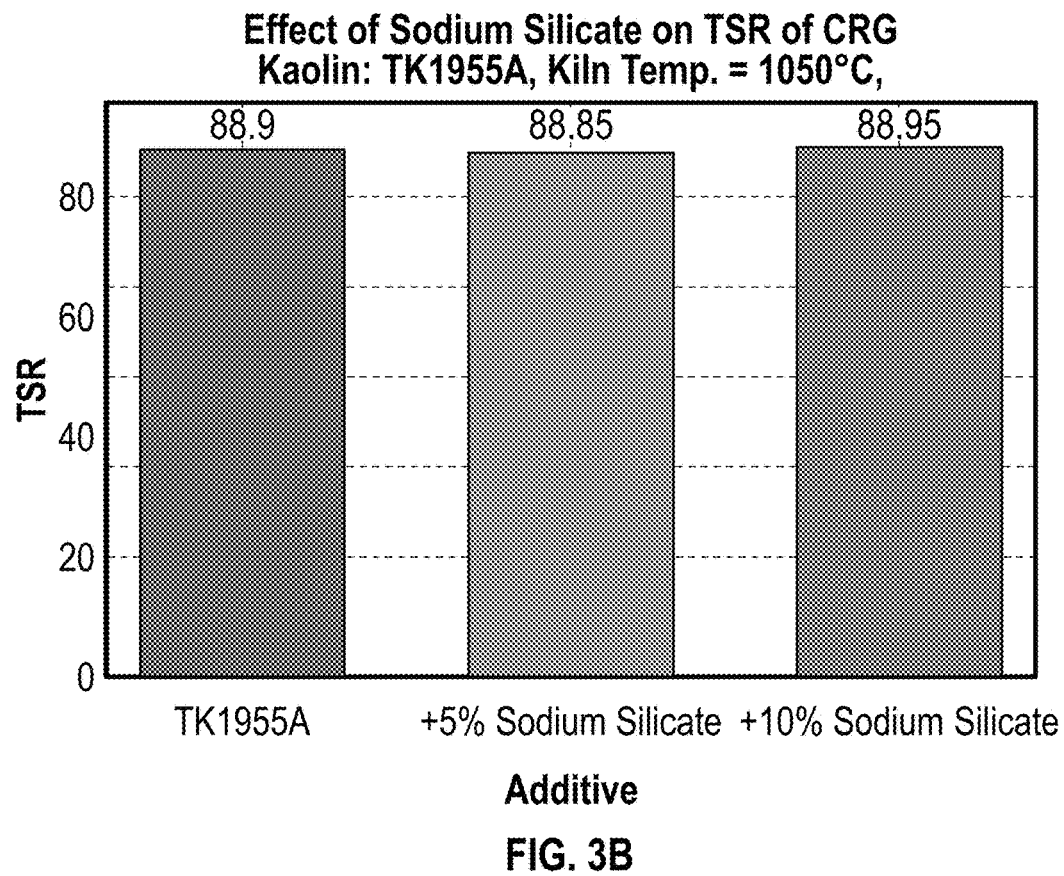
FIGS. 3B, 5B, 7B, 9B, 10B, 11B, 12B, 13B, and 14B illustrate the strength values of various reflective granular compositions using sodium hydroxide as the hardening additive, with various different kaolin compositions and kiln temperatures.

Example 1 illustrates the effect of sodium silicate (5 wt % and 10 wt %) as a hardening agent on the strength (see FIG. 3A) and total solar reflectance (TSR) (see FIG. 3B) of reflective granular compositions (i.e., "cool-roof granules (CRG)) utilizing TK1955A™ kaolin clay available from Thiele Kaolin of Sandersville, GA, when kilned for approximately 60 minutes at 1050° C. As shown in the figures, the strength values improved (decreasing % fines) with increasing amounts of sodium silicate, while the TSR values remained fairly consistent.

Example 2

Figure 4A:
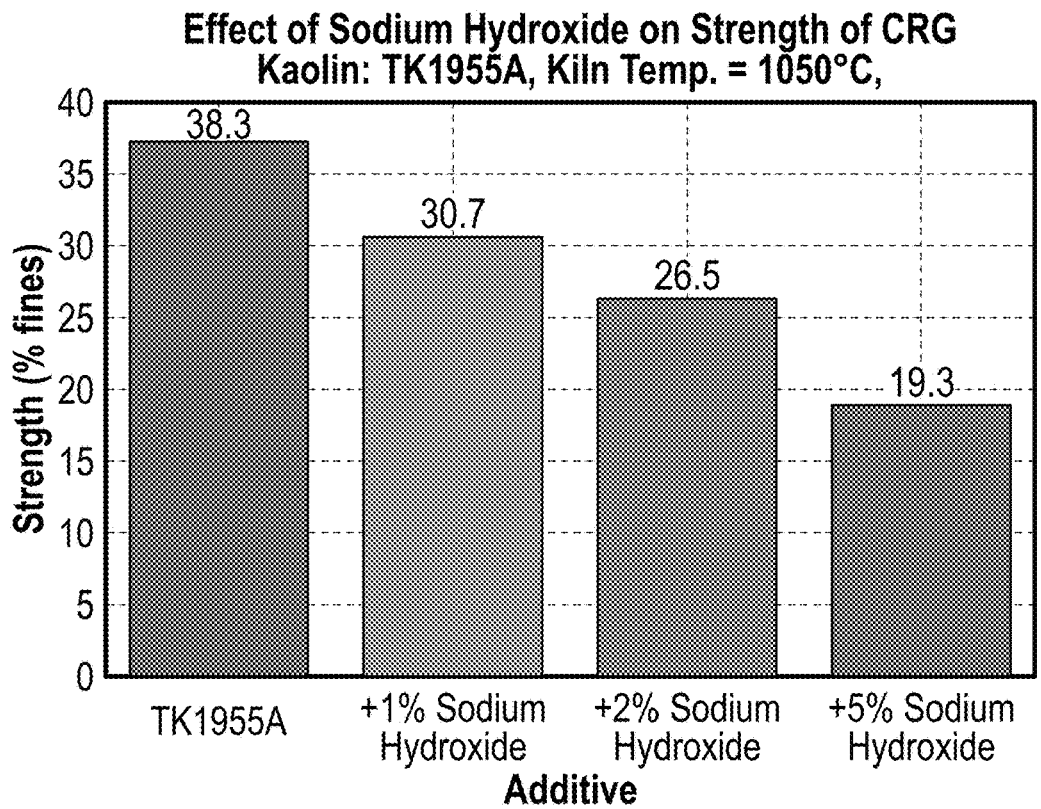
FIGS. 4A, 6A, and 8A illustrate the strength values of various reflective granular compositions using sodium silicate as the hardening additive, with various different kaolin compositions and kiln temperatures.
Figure 4B:
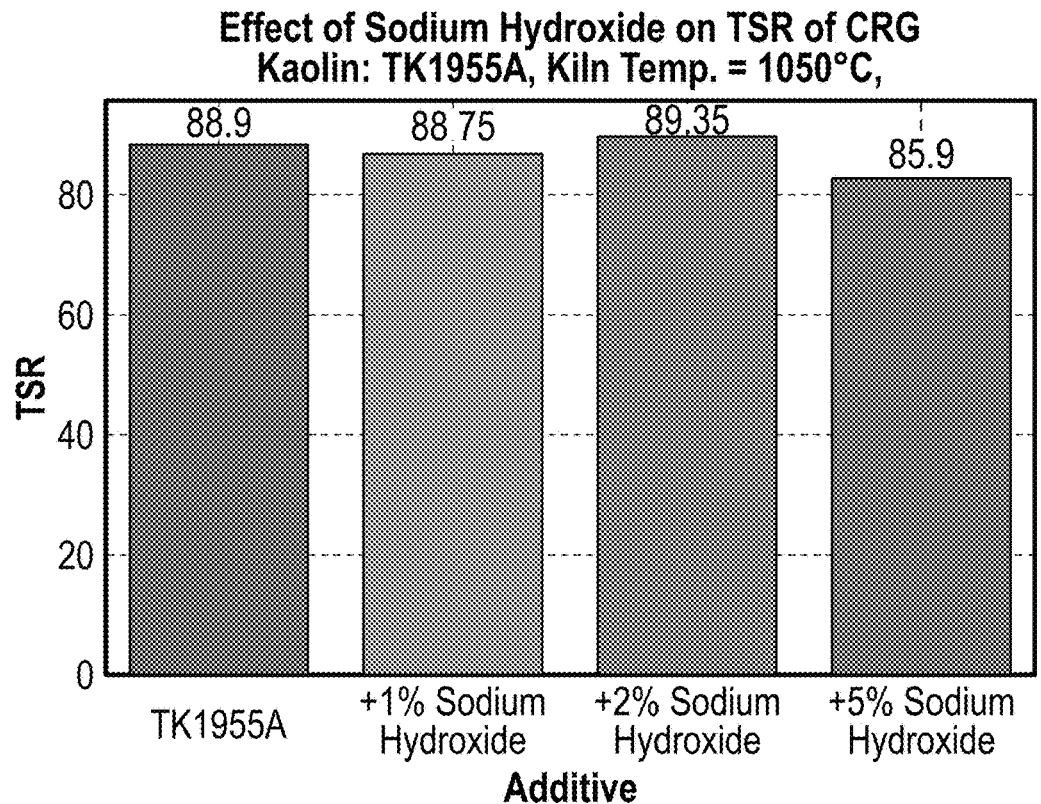
FIGS. 4B, 6B, and 8B illustrate the strength values of various reflective granular compositions using sodium hydroxide as the hardening additive, with various different kaolin compositions and kiln temperatures.

Example 2 illustrates the effect of sodium hydroxide (1 wt %, 2 wt %, and 5 wt %) as a hardening agent on the strength (see FIG. 4A) and total solar reflectance (see FIG. 4B) of reflective granular compositions utilizing TK1955A™ kaolin clay available from Thiele Kaolin of Sandersville, GA, when kilned for approximately 60 minutes at 1050° C. As shown in the figures, the strength values improved (decreasing % fines) with increasing amounts of sodium hydroxide, while the TSR values remained fairly consistent.

Example 3

Figure 5A:
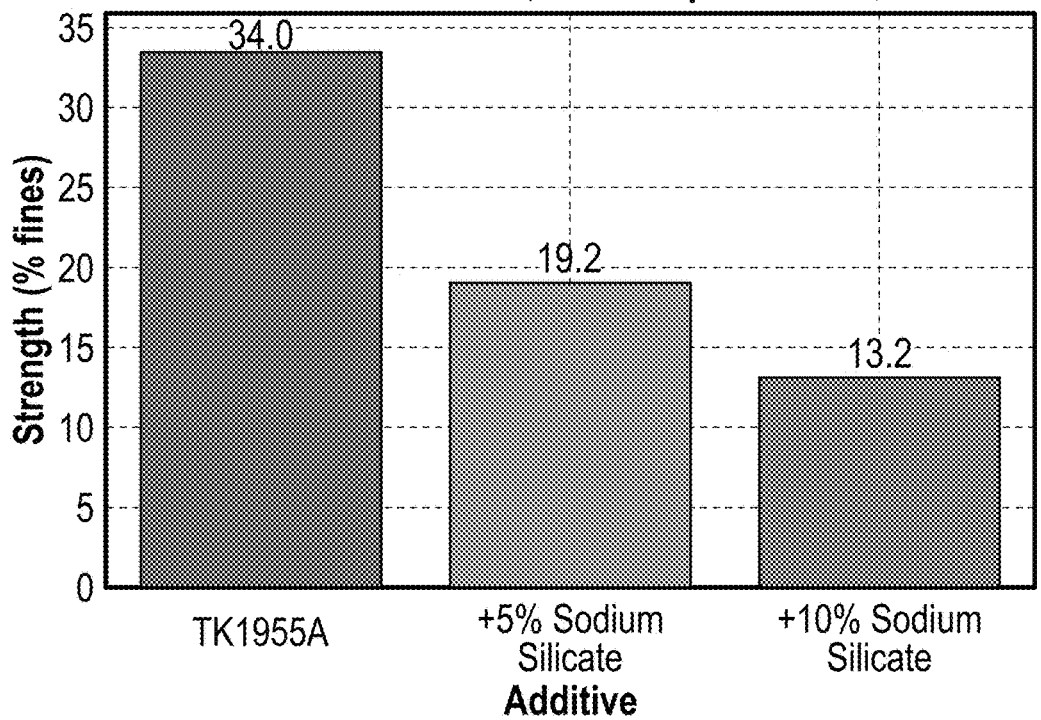
Figure 5B:
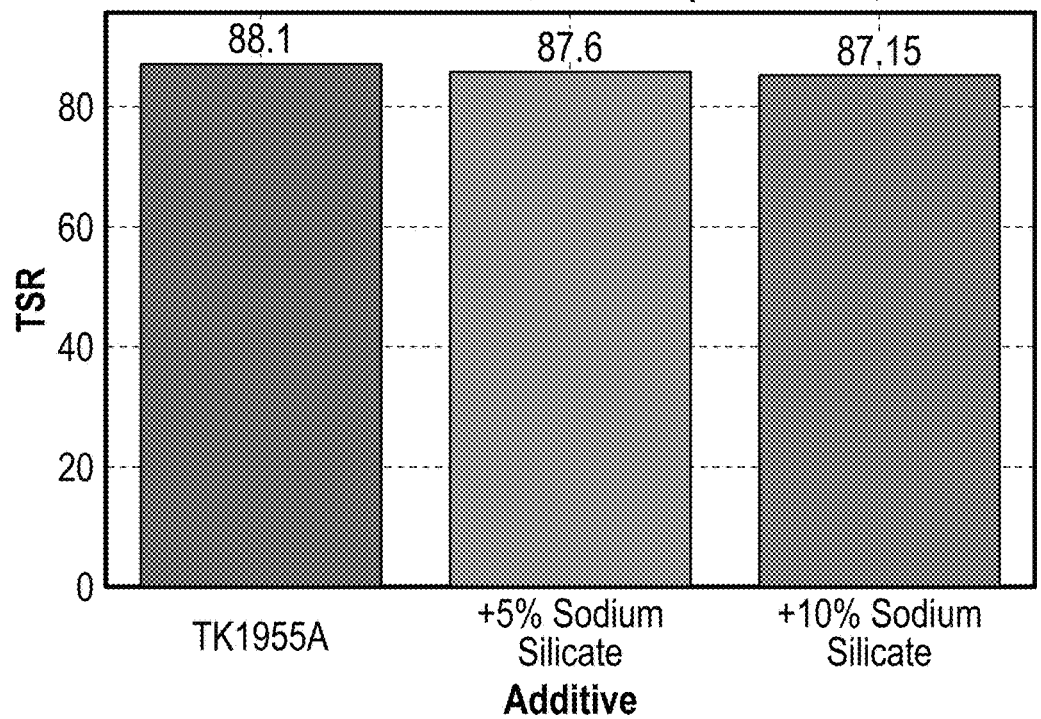

Example 3 illustrates the effect of sodium silicate (5 wt % and 10 wt %) as a hardening agent on the strength (see FIG. 5A) and total solar reflectance (see FIG. 5B) of reflective granular compositions utilizing TK1955A™ kaolin clay available from Thiele Kaolin of Sandersville, GA, when kilned for approximately 60 minutes at 1150° C. As shown in the figures, the strength values improved (decreasing % fines) with increasing amounts of sodium silicate, while the TSR values remained fairly consistent.

Example 4

Figure 6A:
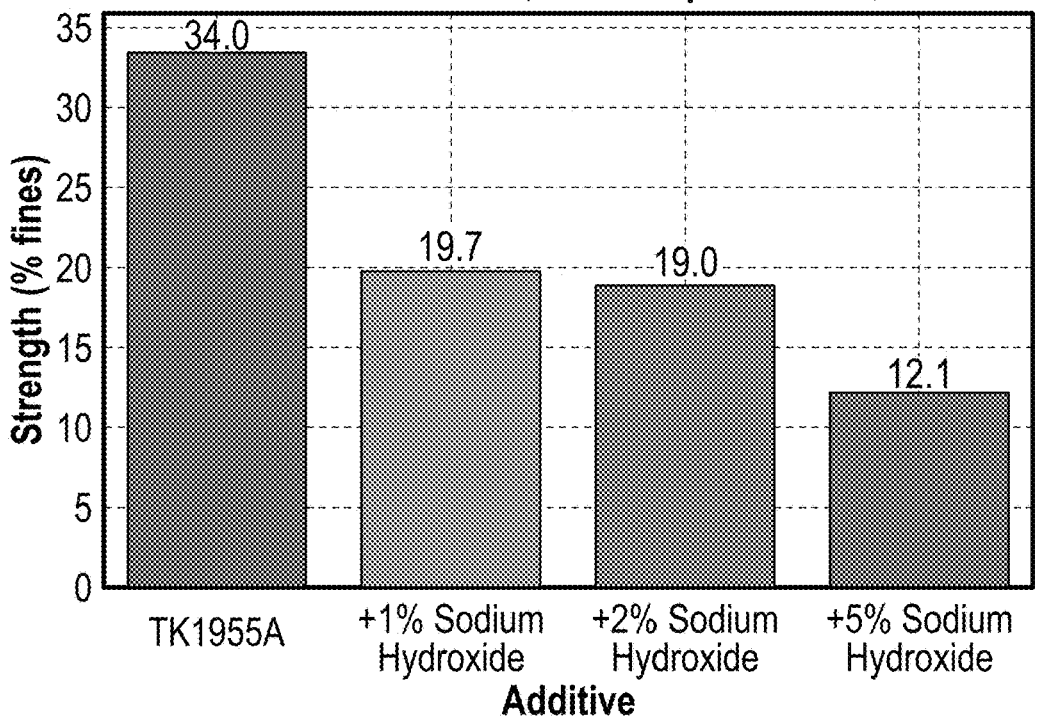
Figure 6B:
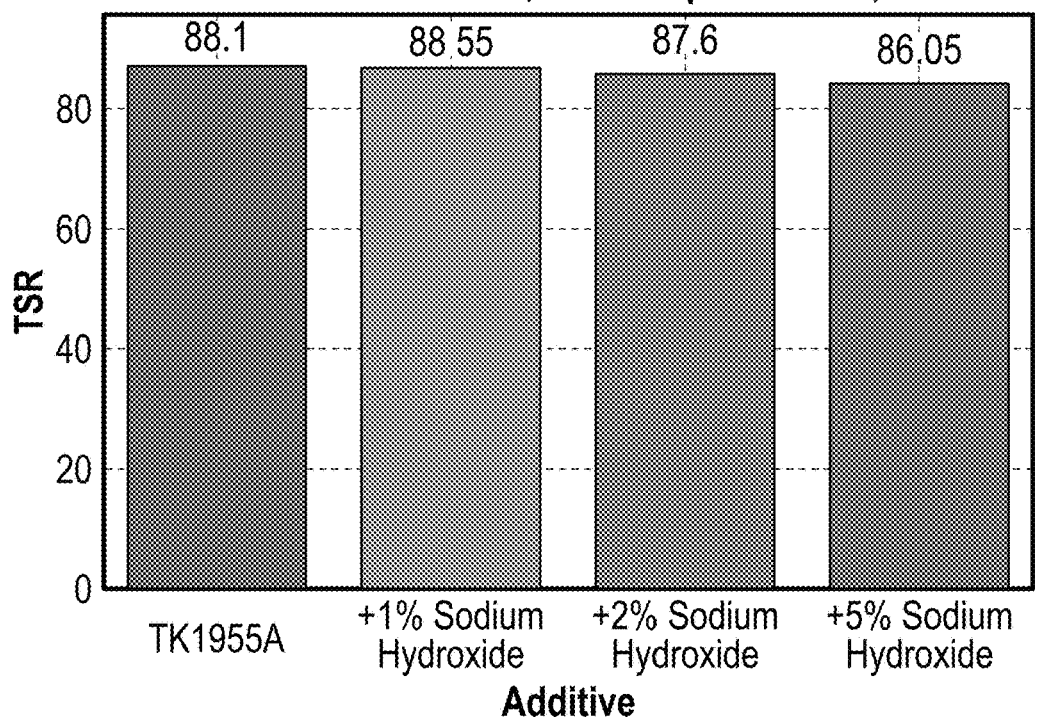

Example 4 illustrates the effect of sodium hydroxide (1 wt %, 2 wt %, and 5 wt %) as a hardening agent on the strength (see FIG. 6A) and total solar reflectance (see FIG. 6B) of reflective granular compositions utilizing TK1955A™ kaolin clay available from Thiele Kaolin of Sandersville, GA, when kilned for approximately 60 minutes at 1150° C. As shown in the figures, the strength values improved (decreasing % fines) with increasing amounts of sodium hydroxide, while the TSR values remained fairly consistent.

Example 5

Figure 7A:
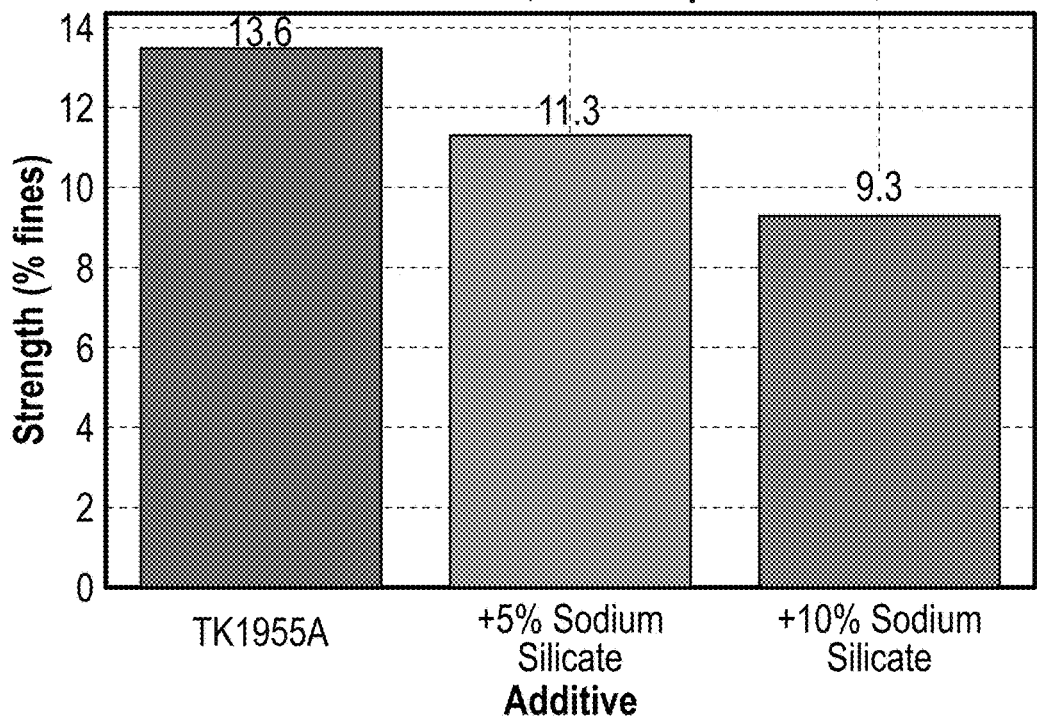
Figure 7B:
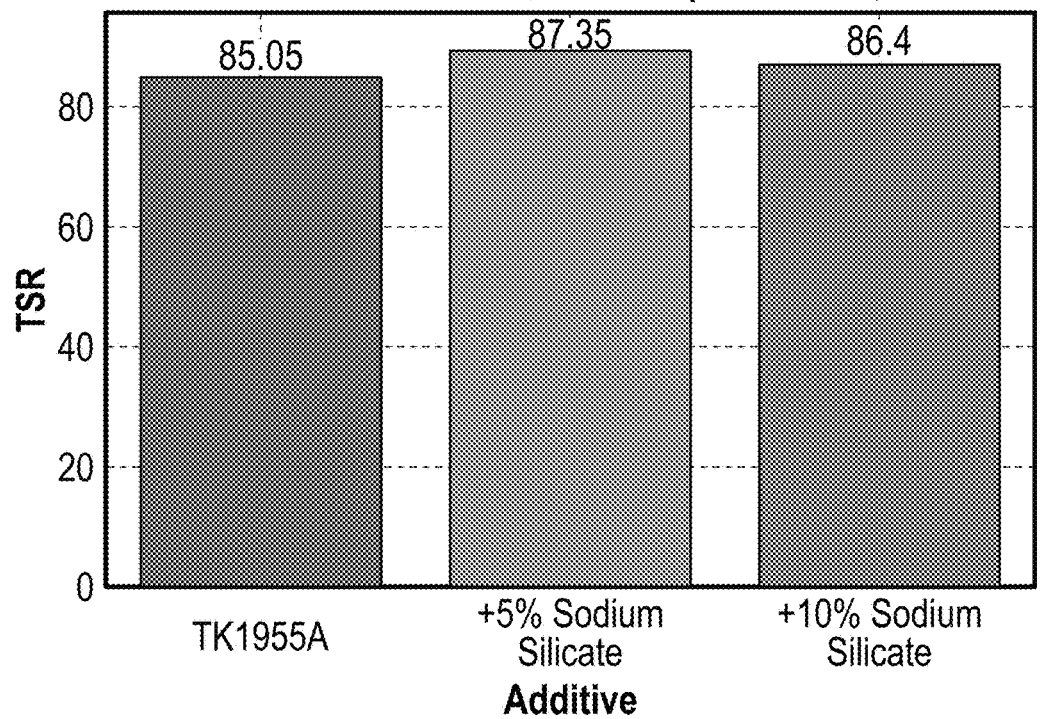

Example 5 illustrates the effect of sodium silicate (5 wt % and 10 wt %) as a hardening agent on the strength (see FIG. 7A) and total solar reflectance (see FIG. 7B) of reflective granular compositions utilizing TK1955A™ kaolin clay available from Thiele Kaolin of Sandersville, GA, when kilned for approximately 60 minutes at 1250° C. As shown in the figures, the strength values improved (decreasing % fines) with increasing amounts of sodium silicate, while the TSR values remained fairly consistent.

Example 6

Figure 8A:
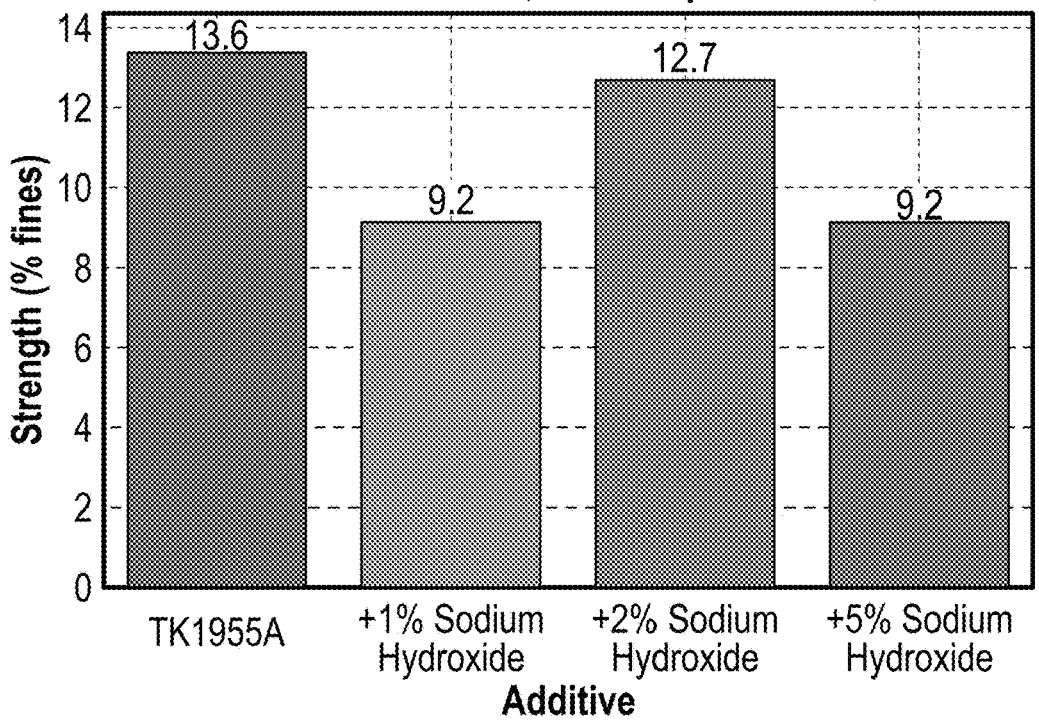
Figure 8B:
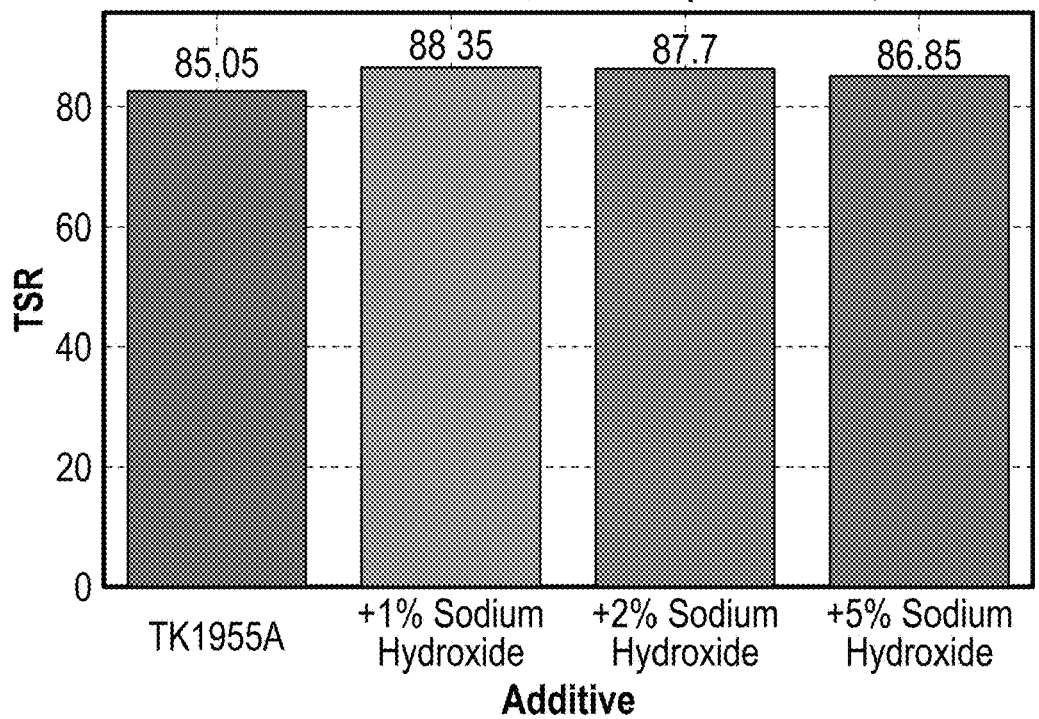

Example 6 illustrates the effect of sodium hydroxide (1 wt %, 2 wt %, and 5 wt %) as a hardening agent on the strength (see FIG. 8A) and total solar reflectance (see FIG. 8B) of reflective granular compositions utilizing TK1955A™ kaolin clay available from Thiele Kaolin of Sandersville, GA, when kilned for approximately 60 minutes at 1250° C. As shown in the figures, the strength values improved (decreasing % fines) with increasing amounts of sodium hydroxide (with the exception of 2 wt %, which although an improvement over the reference, was not an improvement over 1 wt %), while the TSR values remained fairly consistent.

Example 7

Figure 9A:
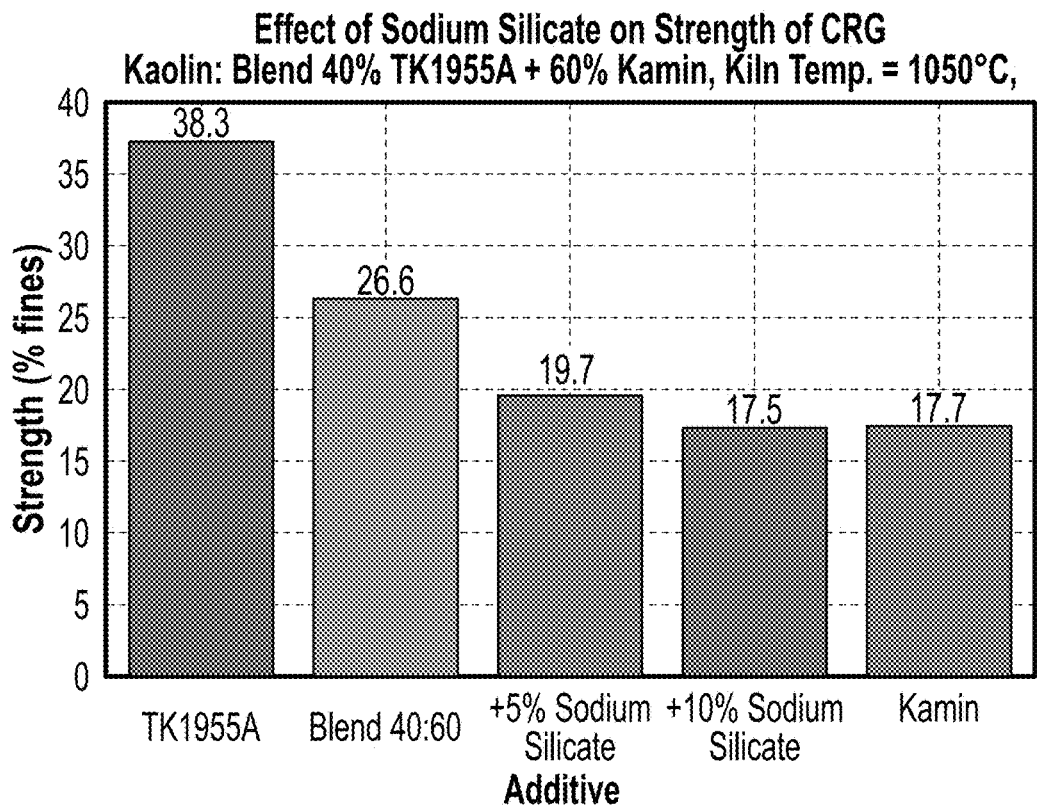
Figure 9B:
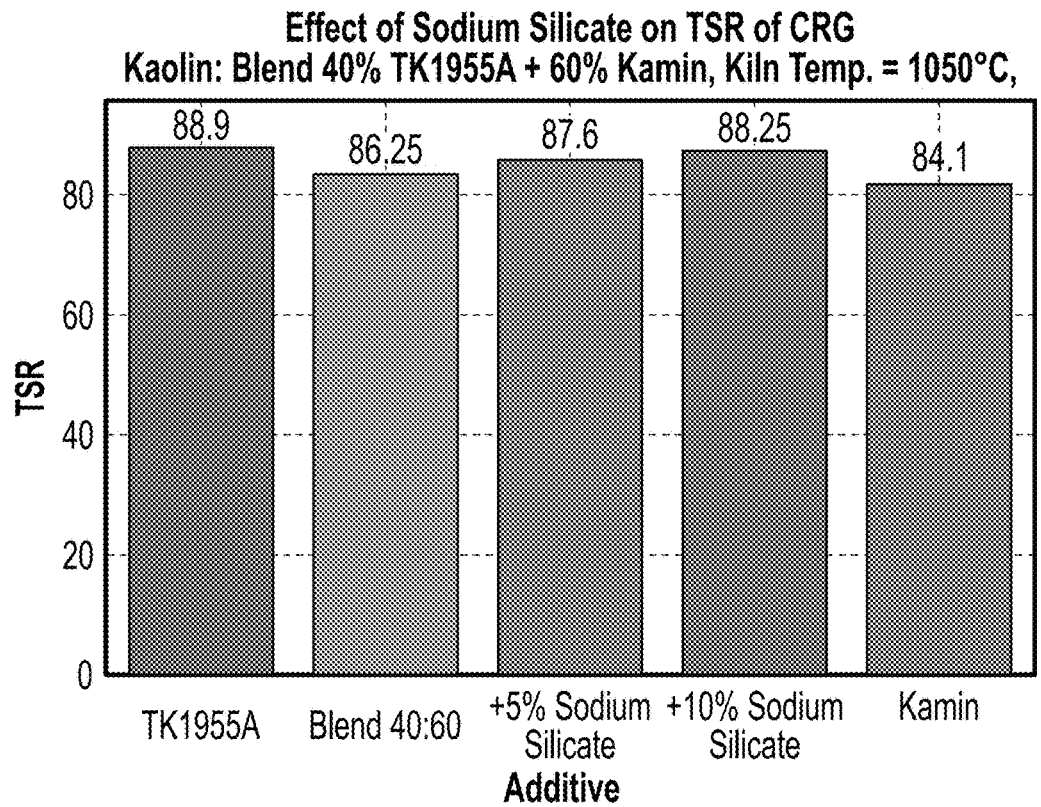

Example 7 illustrates the effect of sodium silicate (5 wt % and 10 wt %) as a hardening agent on the strength (see FIG. 9A) and total solar reflectance (see FIG. 9B) of reflective granular compositions utilizing a 40%:60% blend of TK1955A™ kaolin clay available from Thiele Kaolin of Sandersville, GA and kaolin clay available from KaMin Solutions of Macon, GA, when kilned for approximately 60 minutes at 1050° C. As shown in the figures, the strength values improved (decreasing % fines) with increasing amounts of sodium silicate in reference to the solely TK1955A reference and the blend reference, but were consistent with the solely Kamin reference, while the TSR values remained fairly consistent for all but the solely Kamin reference, which was worst.

Example 8

Figure 10A:
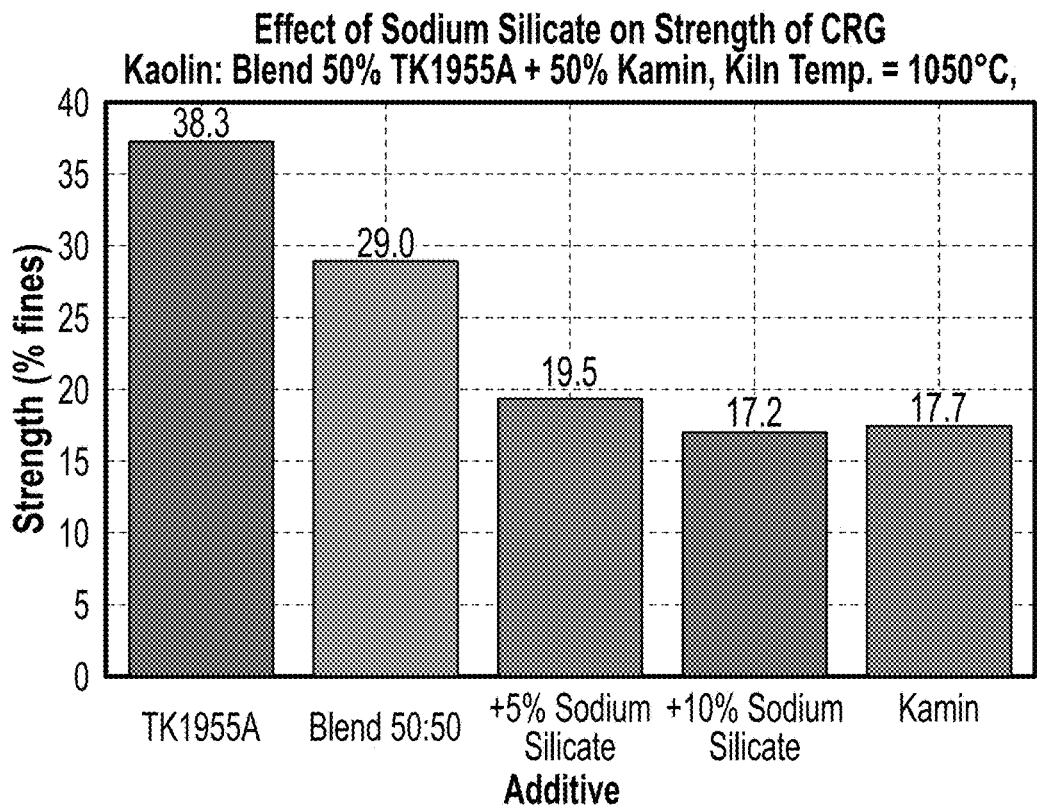
Figure 10B:
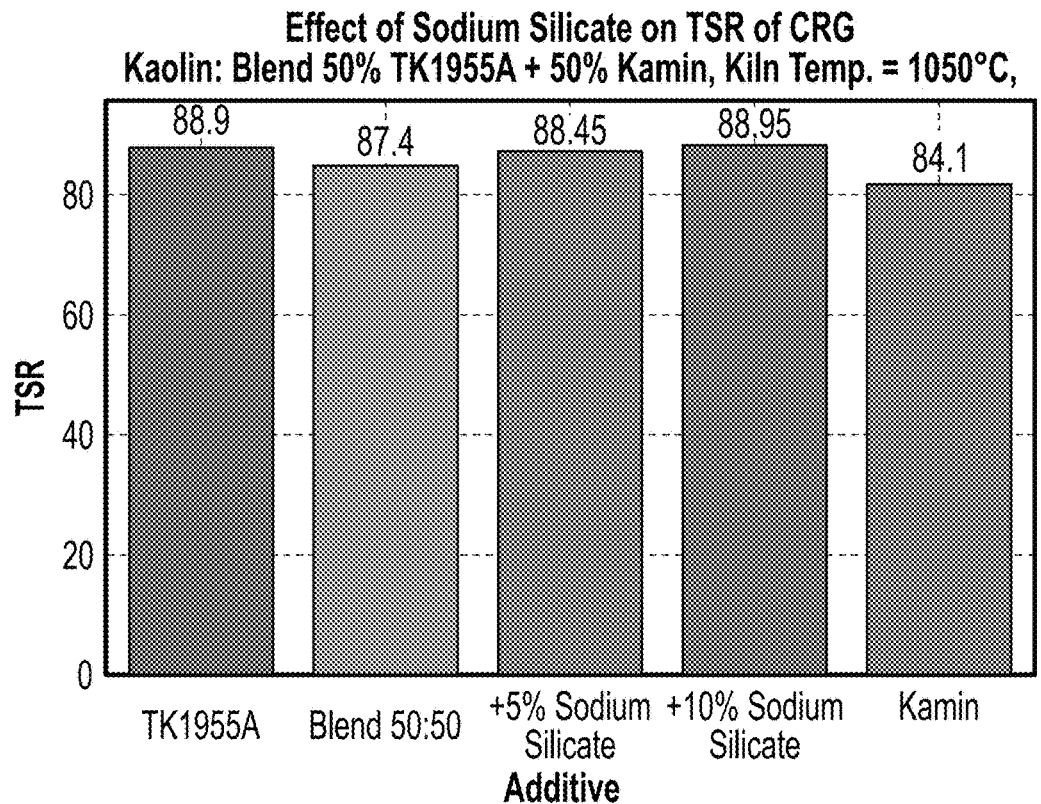

Example 8 illustrates the effect of sodium silicate (5 wt % and 10 wt %) as a hardening agent on the strength (see FIG. 10A) and total solar reflectance (see FIG. 10B) of reflective granular compositions utilizing a 50%:50% blend of TK1955A™ kaolin clay available from Thiele Kaolin of Sandersville, GA and kaolin clay available from KaMin Solutions of Macon, GA, when kilned for approximately 60 minutes at 1050° C. As shown in the figures, the strength values improved (decreasing % fines) with increasing amounts of sodium silicate in reference to the solely TK1955A reference and the blend reference, but were consistent with the solely Kamin reference, while the TSR values remained fairly consistent for all but the solely Kamin reference, which was worst.

Example 9

Figure 11A:
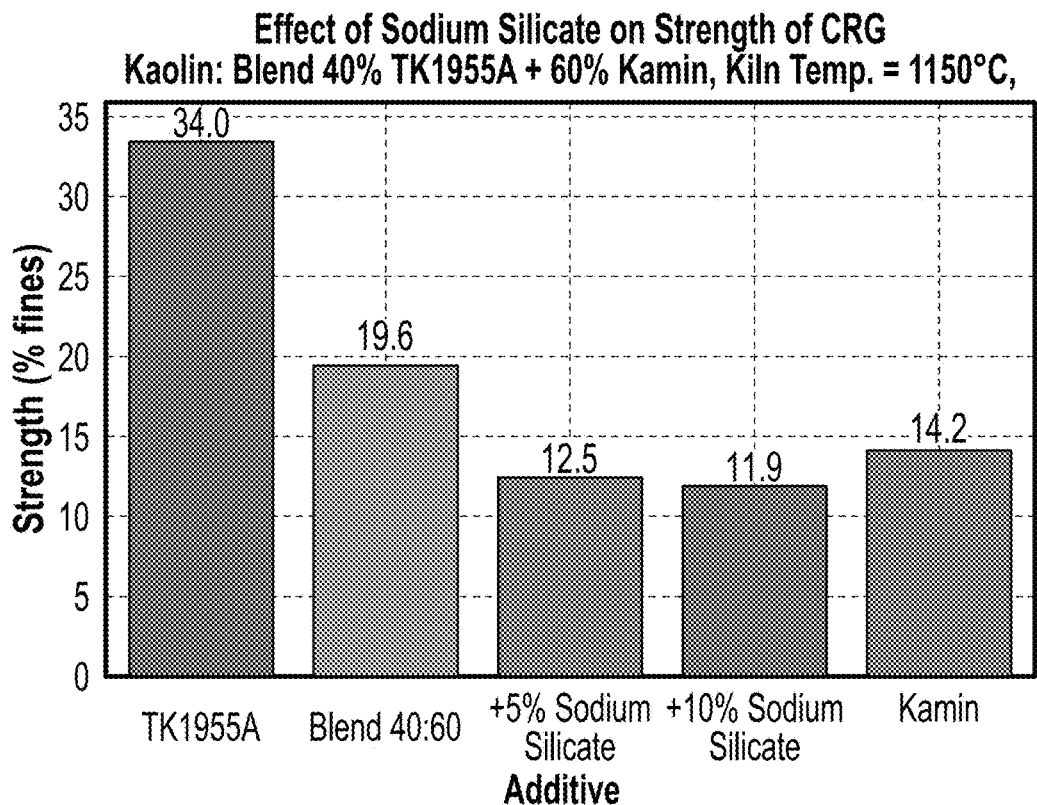
Figure 11B:
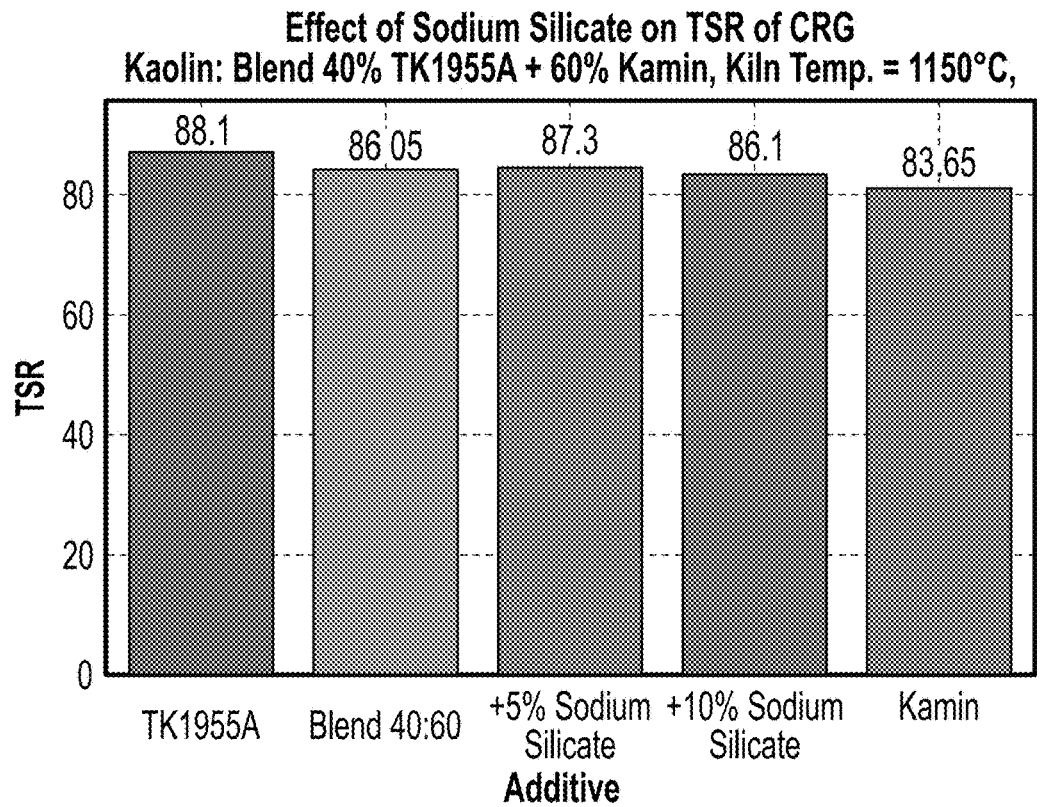

Example 9 illustrates the effect of sodium silicate (5 wt % and 10 wt %) as a hardening agent on the strength (see FIG. 11A) and total solar reflectance (see FIG. 11B) of reflective granular compositions utilizing a 40%:60% blend of TK1955A™ kaolin clay available from Thiele Kaolin of Sandersville, GA and kaolin clay available from KaMin Solutions of Macon, GA, when kilned for approximately 60 minutes at 1150° C. As shown in the figures, the strength values improved (decreasing % fines) with increasing amounts of sodium silicate for all of the references, while the TSR values remained fairly consistent for all but the solely Kamin reference, which was worst.

Example 10

Figure 12A:
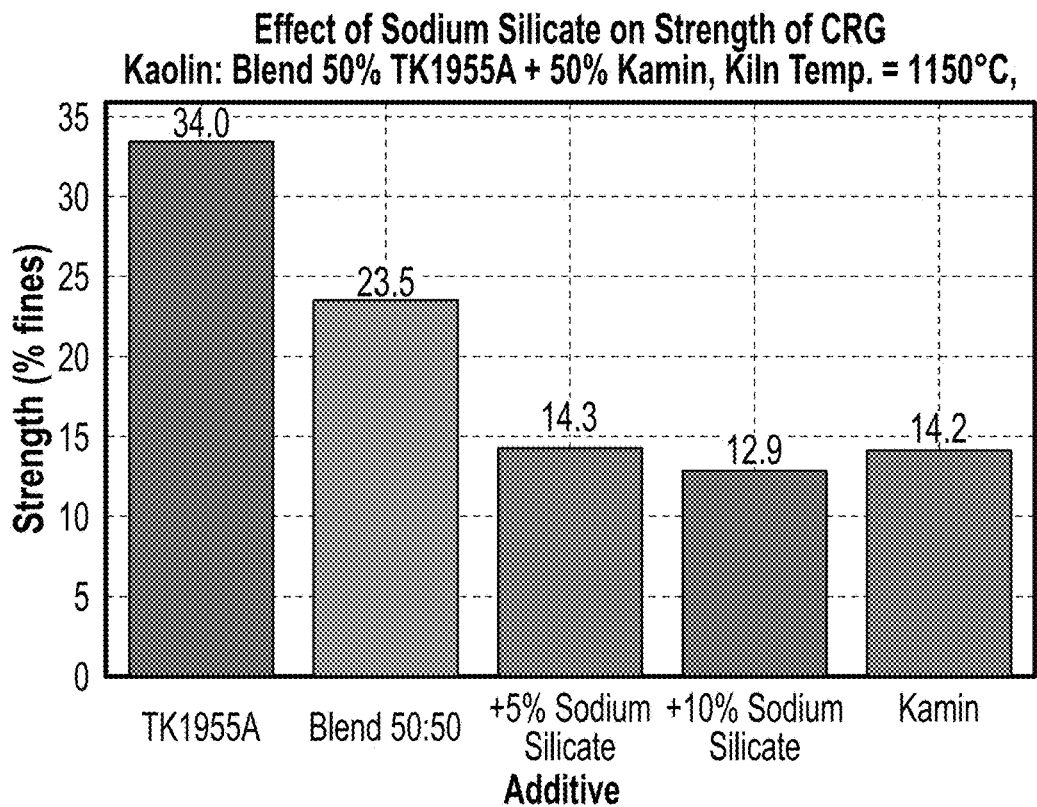
Figure 12B:
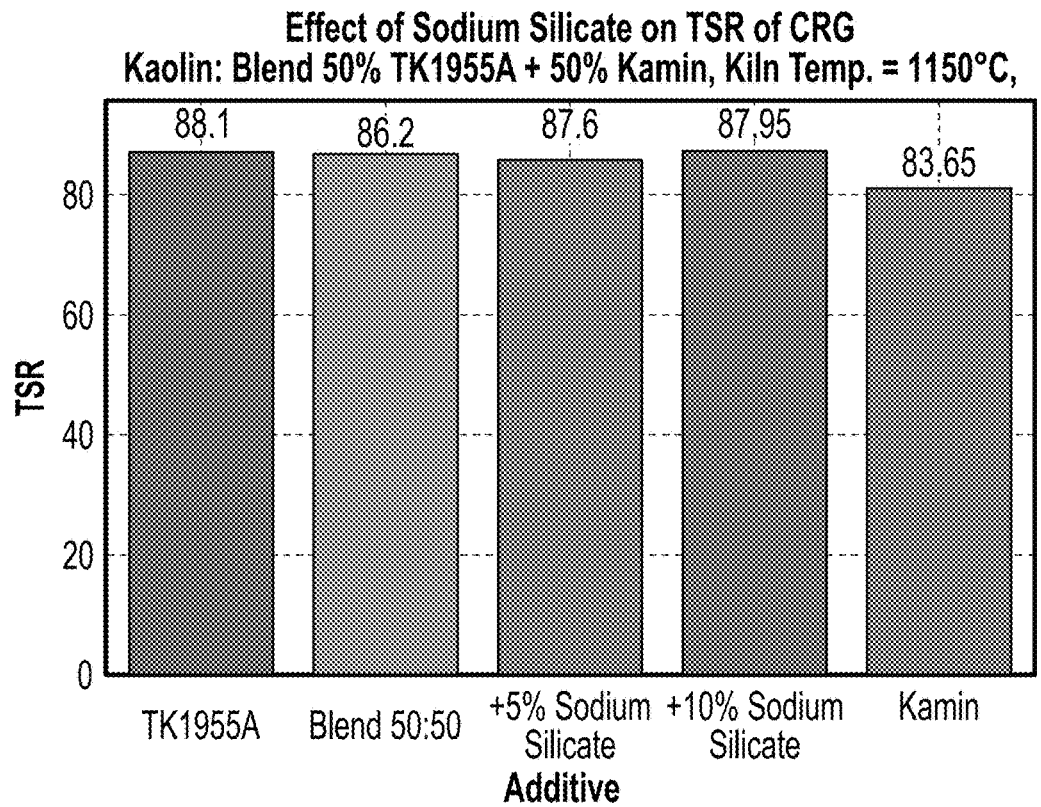

Example 10 illustrates the effect of sodium silicate (5 wt % and 10 wt %) as a hardening agent on the strength (see FIG. 12A) and total solar reflectance (see FIG. 12B) of reflective granular compositions utilizing a 50%:50% blend of TK1955A™ kaolin clay available from Thiele Kaolin of Sandersville, GA and kaolin clay available from KaMin Solutions of Macon, GA, when kilned for approximately 60 minutes at 1150° C. As shown in the figures, the strength values improved (decreasing % fines) with increasing amounts of sodium silicate in reference to the solely TK1955A reference and the blend reference, but were consistent with the solely Kamin reference, while the TSR values remained fairly consistent for all but the solely Kamin reference, which was worst.

Example 11

Figure 13A:
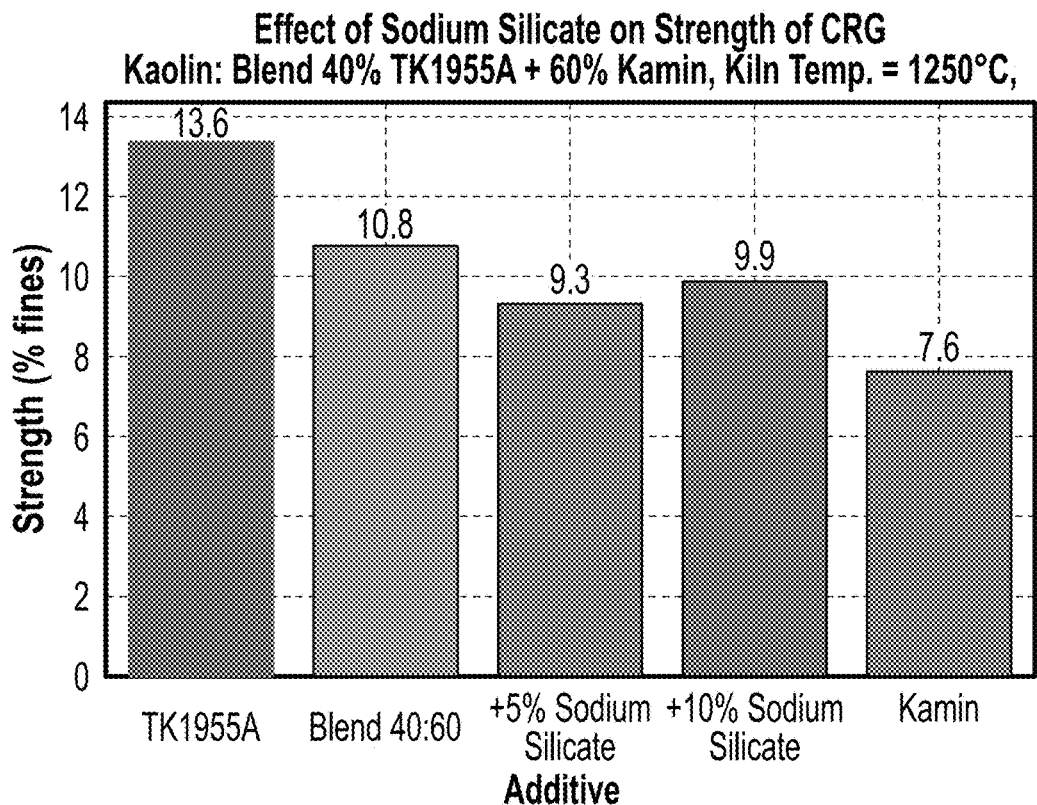
Figure 13B:
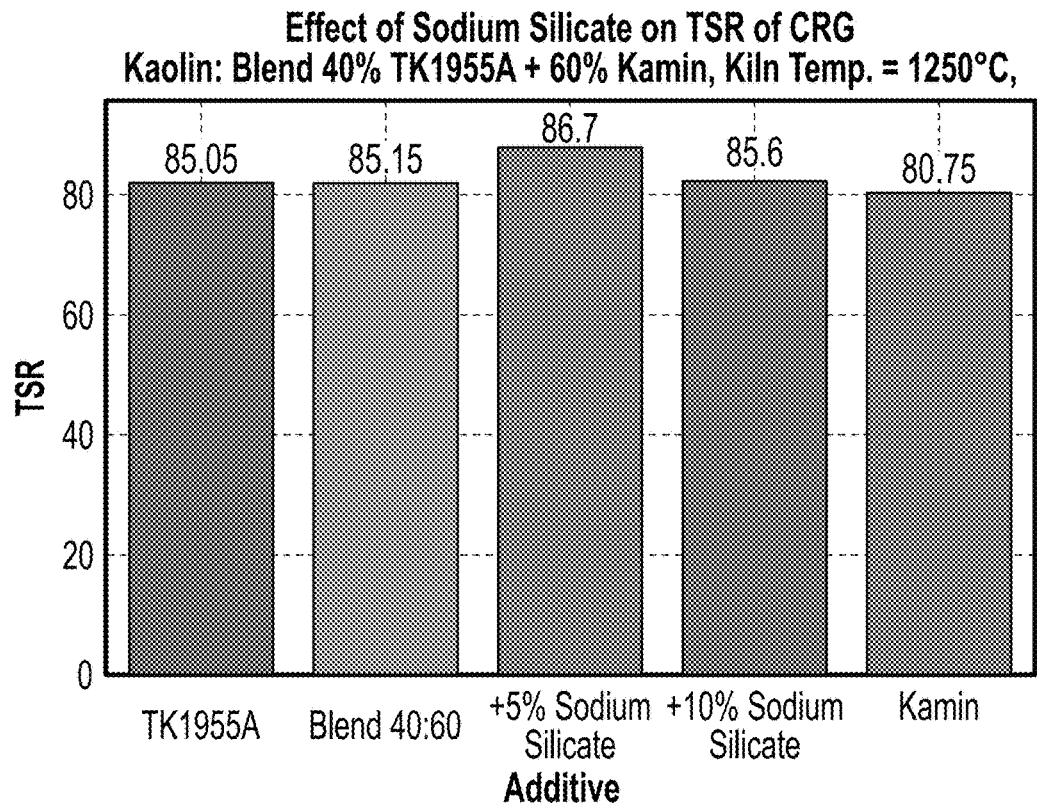

Example 11 illustrates the effect of sodium silicate (5 wt % and 10 wt %) as a hardening agent on the strength (see FIG. 13A) and total solar reflectance (see FIG. 13B) of reflective granular compositions utilizing a 40%:60% blend of TK1955A™ kaolin clay available from Thiele Kaolin of Sandersville, GA and kaolin clay available from KaMin Solutions of Macon, GA, when kilned for approximately 60 minutes at 1250° C. As shown in the figures, the strength values improved (decreasing % fines) with increasing amounts of sodium silicate in reference to the solely TK1955A reference and the blend reference, but were less strong with the solely Kamin reference, while the TSR values remained fairly consistent for all but the solely Kamin reference, which was worst.

Example 12

Figure 14A:
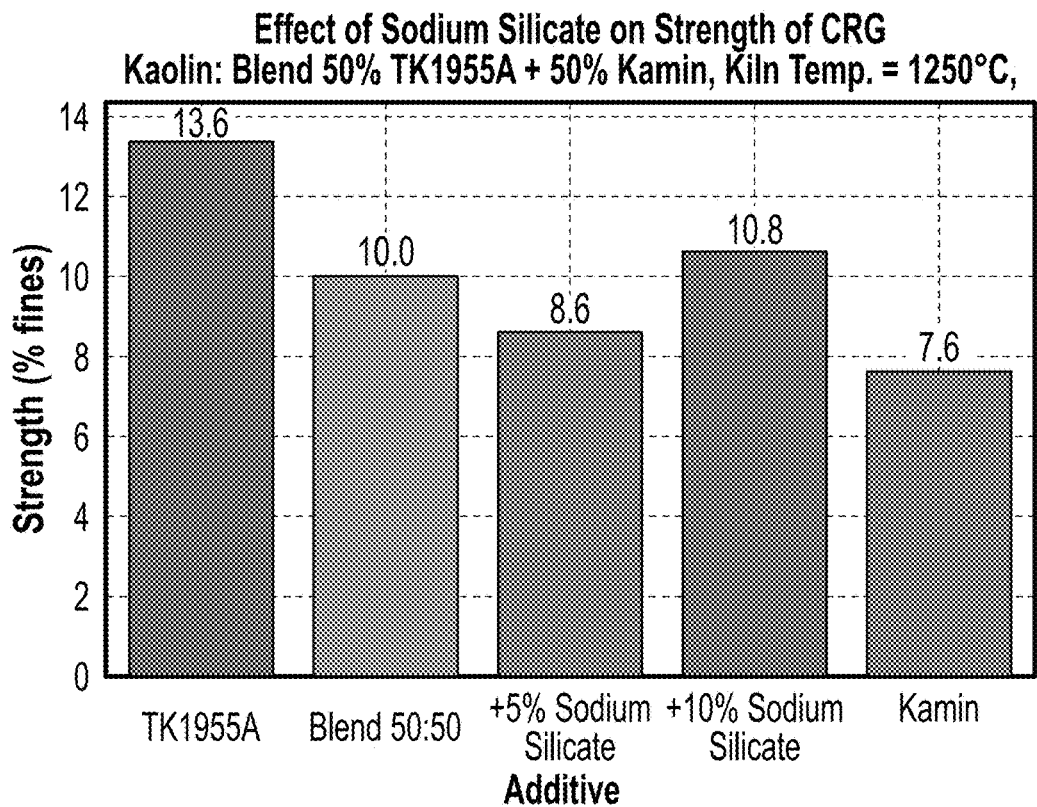
Figure 14B:
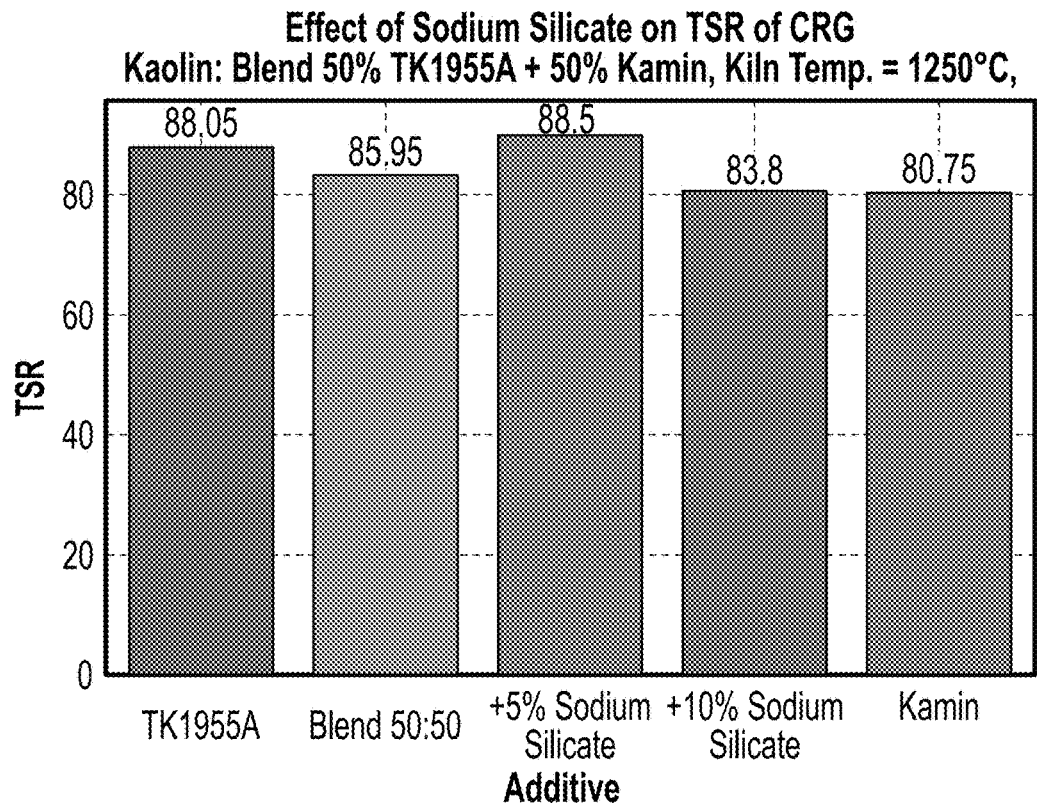

Example 12 illustrates the effect of sodium silicate (5 wt % and 10 wt %) as a hardening agent on the strength (see FIG. 14A) and total solar reflectance (see FIG. 14B) of reflective granular compositions utilizing a 50%:50% blend of TK1955A™ kaolin clay available from Thiele Kaolin of Sandersville, GA and kaolin clay available from KaMin Solutions of Macon, GA, when kilned for approximately 60 minutes at 1250° C. As shown in the figures, the strength values improved (decreasing % fines) with increasing amounts of sodium silicate for the solely TK1955A reference, whereas the 5 wt % example showed an improvement over the blend reference but not the solely KaMin reference and the 10 wt % example showed less strength over each of the blend and solely KaMin references, while the TSR values were best for the 5% example and worst for the solely Kamin reference, the other examples and references being fairly consistent.

As such, the present disclosure has provided embodiments of improved reflective granular compositions, and methods of making the same, that are highly reflective to solar radiation. Desirably, these reflective granular compositions include granules with improved strength that are resistant to breaking during storage, transportation, and application. Still further, the present disclosure has provided new methods for analyzing the strength of such reflective granular compositions to ensure the quality of the source materials employed and to optimize their composition.

While at least one exemplary embodiment has been presented in the foregoing detailed description, it should be appreciated that a vast number of variations exist. It should also be appreciated that the exemplary embodiments are only examples, and are not intended to limit the scope, applicability, or configuration of the invention in any way. Rather, the foregoing detailed description will provide those skilled in the art with a convenient road map for implementing an exemplary embodiment of the inventive compositions and methods. It is understood that various changes may be made in the function and arrangement of elements described in an exemplary embodiment without departing from the scope of the invention as set forth in the appended claims.

What is claimed is:

1. A reflective granular composition comprising:
    a reflective pigment material comprising a majority of kaolin clay; and
    a hardening additive comprising a sodium salt or another salt,
    wherein the sodium salt or the another salt comprises from about 1% to about 15% by weight of the overall reflective granular composition,
    wherein the kaolin clay comprises at least about 80% by weight of the overall reflective granular composition.

2. The reflective granular composition claim 1, wherein the reflective pigment material comprises a secondary pigment component selected from the group consisting of: metal and transition metal oxides, alkaline earth metal sulfates, alkaline earth metal carbonates, transition metal silicates, metal silicates, minerals, and mixtures thereof.

3. The reflective granular composition of claim 1, wherein the kaolin clay comprises about 100% by weight of the reflective pigment material.

4. The reflective granular composition of claim 1, wherein the sodium salt or the another salt comprises from about 3% to about 12% by weight of the overall reflective granular composition.

5. The reflective granular composition of claim 1, wherein the sodium salt is selected from the group consisting of: sodium silicate, sodium hydroxide, sodium carbonate, sodium chloride, sodium polyacrylate, sodium sulfate, sodium thiosulfate, sodium phosphate, and mixtures thereof; or
    wherein the another salt is selected from the group consisting of: any of the foregoing salts of barium, potassium, calcium, and lithium.

6. The reflective granular composition of claim 1, wherein the kaolin clay comprises at least 90% by weight of the overall reflective granular composition.

7. A roofing material comprising the reflective granular composition of claim 1.

8. A method for making a reflective granular composition comprising the steps of:
    mixing together a reflective pigment material comprising a majority of kaolin clay and a hardening additive comprising a sodium salt or another salt to form a particulate mixture;
    forming a slurry from the particulate mixture by adding to the particulate mixture water and a binder material;
    granulating the slurry;
    drying the granulated slurry; and
    kilning the dried, granulated slurry to form the reflective granular composition,
    wherein the sodium salt or the another salt comprises from about 1% to about 15% by weight of the overall reflective granular composition,
    wherein the kaolin clay comprises at least about 80% by weight of the overall reflective granular composition.

9. The method of claim 8, wherein the reflective pigment material comprises a secondary pigment component selected from the group consisting of: metal and transition metal oxides, alkaline earth metal sulfates, alkaline earth metal carbonates, transition metal silicates, metal silicates, minerals, and mixtures thereof.

10. The method of claim 8, wherein the kaolin clay comprises about 100% by weight of the reflective pigment material.

11. The method of claim 8, wherein the sodium salt is selected from the group consisting of: sodium silicate, sodium hydroxide, sodium carbonate, sodium chloride, sodium polyacrylate, sodium sulfate, sodium thiosulfate, sodium phosphate, and mixtures thereof; or
    wherein the another salt is selected from the group consisting of: any of the foregoing salts of barium, potassium, calcium, and lithium.

12. The method of claim 8, wherein the water is added in an amount of about 20% to about 50% by weight of the particulate mixture.

13. The method of claim 8, wherein the binder material is added in an amount of about 1% to about 10% by weight of the particulate mixture.

14. The method of claim 8, wherein granulating the slurry comprises extruding the slurry or Niro spraying the slurry.

15. The method of claim 8, further comprising the step of crushing the dried, granulated slurry prior to kilning the dried, granulated slurry.

16. The method of claim 8, wherein kilning is performed at a temperature of about 1000° C. to about 1300° C. for a time period of about 30 minutes to about 90 minutes.

* * * * *